June 5, 1951 W. A. HYLAND 2,556,086
GRAIN DRILL AXLE CONSTRUCTION
Filed Dec. 22, 1945
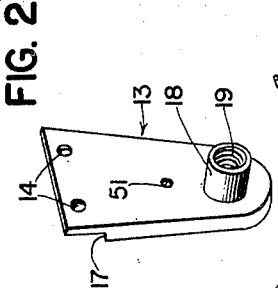
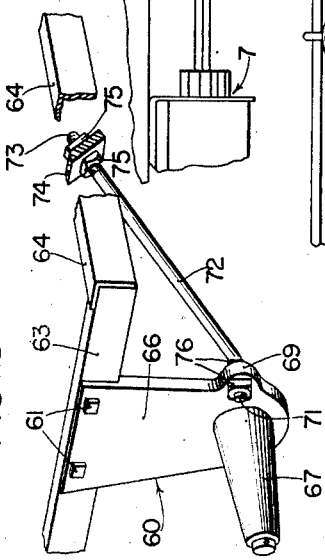
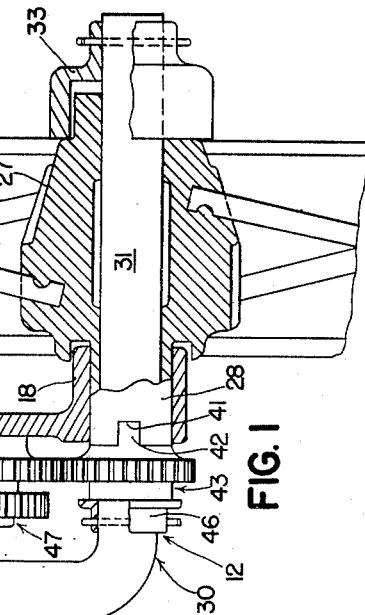
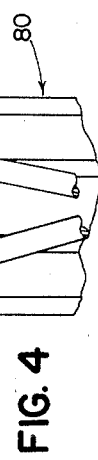
INVENTOR.
WILLIAM A. HYLAND
ATTORNEYS.

Patented June 5, 1951

2,556,086

UNITED STATES PATENT OFFICE 2,556,086

GRAIN DRILL AXLE CONSTRUCTION

William A. Hyland, Horicon, Wis., assignor to John Deere Van Brunt Company, a corporation of Wisconsin Application December 22, 1945, Serial No. 636,839

2 Claims. (Cl. 111—52)

The present invention relates generally to agricultural implements and more particulary to new and useful improvements in grain drills or the like.

The object and general nature of the present invention is the provision of a grain drill having a special axle construction which will accommodate small size wheels on which either new or used conventional automobile tires may be fitted. It is also a feature of this invention to provide a new and improved drive mechanism particularly adapted for use in a drop axle construction for grain drills or the like in which a strut or bracket is connected to the grain drill and at its lower end is provided with a wheel-receiving portion on which the ground wheel is directly mounted so that the weight of the grain drill box and associated parts may be carried directly by the wheels without passing through a multiplicity of parts.

These and other objects and advantages of the present invention will be apparent to those skilled in the art after a consideration of the following detailed description, taken in conjunction with the accompanying drawings.

In the drawings:

Figure 1 is a front view of one end of a grain drill in which the principles of the present invention have been incorporated, certain parts being broken away.

Figure 2 is a fragmentary perspective view of the strut bracket employed in the construction shown in Figure 1.

Figure 3 is a fragmentary perspective view showing a modified form of the present invention.

Figure 4 is a detailed sectional view showing the strut and wheel bearing construction employed in the form of the invention shown in Figure 3.

Referring now more particularly to Figures 1 and 2, the grain drill, which is indicated in its entirety by the reference numeral 1, comprises a frame 2 which includes a transversely arranged frame angle 3 and a generally longitudinally extending frame angle 4 suitably connected together. The grain drill 1 includes a seed box 6 and a plurality of seeding devices 7, both of conventional construction so far as the present invention is concerned, the seed box 6 including end members 8 which extend downwardly and are bolted, as at 9, to the longitudinal frame angles 4.

According to the principles of the present invention, I provide an axle construction 12 which is made up of a relatively heavy bracket or strut member 13 which is apertured at its upper end, as at 14 (Figure 2), to receive bolts 15 (Figure 1) by which the member 13 may be rigidly fixed to the longitudinal frame member 4 at that side of the grain drill. Preferably, but not necessarily, the upper end of the strut section 13 is notched, as at 17, to receive the vertical flange of the frame angle 4. At its lower end the strut section 13 is formed with or carries a laterally outwardly extending bearing sleeve section 18 through which an opening 19 is formed. Preferably, the member 13 is in the form of a casting but if desired the same may be formed as a forging or as a sheet metal structure of suitable gauge. Preferably, also, the bearing sleeve section 18 is integral with the vertical portion of the member 13 but, if desired, the bearing section 18 may be formed separately and secured to the bracket 13 in any suitable way, as by welding or the like.

A ground wheel 25 is mounted for rotation on the bearing section 18, the ground wheel 25 including a conventional rim 26 and a pneumatic tire (not shown), together with a hub 27 which is formed with a laterally inwardly extending journal section 28 which rotates within and bears directly on the bearing section 18. In this way, the weight of the grain drill and associated parts is transmitted by the strut bracket 13 directly to the wheels, the cylindrical portion 28 of the wheel hub 27 fitting snugly within the opening 19 in the bearing seat 18. A bracing member 30 serves to connect the lower end of the strut bracket 13 with the inwardly arranged frame member 3. The bracing member 30 comprises a laterally outwardly extending portion 31 which passes through the center of the hub 27 and at its outer end receives a cap 33 which when pinned to the member 31 serves to hold the wheel in position. The member 30 also includes a laterally inwardly disposed vertical section 34 which terminates upwardly and inwardly in a horizontal section 35 fastened to the inwardly arranged frame member 3 by one or more clamps 36. It will be observed from Figure 1 that the vertically extending portion 34 of the member 30 is disposed laterally of the end of the grain drill, thereby providing adequate space inwardly of the strut bracket 13 for drive connections by which the seeding units 7 may be actuated from the ground wheel 25.

The laterally inner end of the wheel hub section 28 is provided with a pair of notches 41 in which mating lugs 42 on a gear member 43 are adapted to be disposed. The gear member 43 is mounted on the portion 31 of the bracing member 30 and is held in place up against the inner end of the wheel hub by a collar 46 or other suitable means. The gear 43 meshes with a compound gear 47 which is mounted on a bearing member 48 secured, as by bolts 49, extending through an opening 51 in the generally central portion of the vertical strut bracket 13. Other gearing 53, including a throwout arm 54, serves to transmit the drive from the gear 47 to a gear 55 on a shaft 56 that drives the various seeding units 7.

A modified form of the present invention is shown in Figures 3 and 4 in which the use of a bent shaft-like bracing member 30 is eliminated. Referring now to Figures 3 and 4, a vertical bracket or strut section 60 is bolted, as at 61, to the longitudinal frame member 63 of a grain drill frame, which latter includes an inwardly arranged frame angle 64, the angles 63 and 64 being substantially the same as the frame angles 3 and 4 shown in Figure 1. The strut section 60 includes a vertical portion 66, the lower part of which carries or is formed with a laterally outwardly extending wheel-receiving bearing section 67 which is somewhat longer than the bearing section 18 of the strut member 13 of Figure 1. A lug 69 (Figure 3) is formed on or carried by the member 60 and is apertured to receive the outer end 71 of a bracing member 72, the latter member extending laterally inwardly and upwardly and at its upper end 73 extends through a lug 74 welded or otherwise firmly secured to the inwardly arranged frame angle 64. The inner end 73 of the bracing member 72 is threaded and receives a pair of lock nuts 75 by which the bracing member is securely fixed to the grain drill frame. Similarly, a pair of lock nuts 76 fastens the lower and laterally outer end of the bracing member 72 to the attaching lug 69 on the member 60.

A ground wheel 80 is mounted directly on the bearing section 67 and has a hub portion 81 which rotates directly on the bearing section 67. The latter section is apertured to receive a shaft 82, the outer end of which is apertured to receive a pin 83 which extends outwardly a distance sufficient to engage in notches 84 formed on the outer part of the wheel hub 81. At its inner end the shaft 82 carries a gear member 87, preferably fixed thereto by a cap screw 88 or the like thereby cooperating with the pin 83 to retain the shaft 82 in position, and since the pin 83 engages in the notches 84, the shaft 82 serves to transmit the drive from the wheel proper to the gear 87. The latter member meshes with a compound gear member 91 mounted on the strut section 60 in substantially the same manner as the compound gear member 47 mentioned above. Gearing 93, identical for all practical purposes with the gearing 53 described above, serves to transmit the drive from the compound gear 91 to the seeding shaft of the grain drill.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. For use in a grain drill of the drop axle type having a frame including an end member, and seeding means including a driven part disposed laterally inwardly of and generally in the same horizontal plane as said end member, and in which said driven part is adapted to be driven from a ground wheel, the improvement comprising an axle construction including a bracket having an upwardly extending vertical portion and a laterally outwardly extending wheel-receiving bearing section disposed generally at the lower part of said vertical bracket portion and below said driven part, means for fastening the upper end of the vertical portion of said bracket to said end member, a ground wheel rotatably received by said outwardly extending bearing section, a driving member extending through at least the laterally inner portion of said bearing section to a position beyond the laterally inner end thereof and connected at its outer end with said ground wheel, and means operatively connected with the inner end of said driving member at the laterally inner side of said bracket and including means mounted on said vertical bracket portion above said driving member and below said driven part for connecting the laterally inner end of said driving member with said driven part for driving the latter.

2. In a grain drill of the drop axle type having a frame and means thereon adapted to be driven, an axle construction comprising a generally vertically disposed strut having a laterally outwardly extending wheel-receiving portion, a ground wheel carried by said wheel-receiving portion, a generally transversely disposed driving member disposed axially of and carried by said wheel-receiving section, means connecting the outer end of said driving member to the laterally outer portion of said ground wheel, means at the inner end of said driving member comprising a gear member fixed to the inner end of said driving member for rotation therewith and engaging the laterally inner part of said wheel-receiving portion, whereby said gear member holds said ground wheel on said wheel-receiving section, and means for transmitting motion from said gear member to the driven means on said frame, including gear means meshing with said gear member and mounted for rotation on said vertically disposed strut.

WILLIAM A. HYLAND.

REFERENCES CITED

The following references are of record in the file of this patent:

UNITED STATES PATENTS

| Number | Name | Date |
| --- | --- | --- |
| 168,918 | Patric et al. | Oct. 19, 1875 |
| 184,268 | Smith et al. | Nov. 14, 1876 |
| 208,388 | Gere | Sept. 24, 1878 |
| 292,235 | Koeller | Jan. 22, 1884 |
| 694,598 | Armitage | Mar. 4, 1902 |
| 1,226,867 | Dempsey | May 22, 1917 |
| 1,770,641 | Brennan | July 15, 1930 |
| 1,946,624 | Irish | Feb. 13, 1934 |
| 2,308,081 | Hyland et al. | Jan. 12, 1943 |
| 2,391,975 | Hyland | Jan. 1, 1946 |

FOREIGN PATENTS

| Number | Country | Date |
| --- | --- | --- |
| 3,618/17 | Australia | Aug. 22, 1917 |